United States Patent [19]

Hirosawa

[11] Patent Number: 4,873,569
[45] Date of Patent: Oct. 10, 1989

[54] IMAGE READER HAVING SPECTROSCOPE FOR COLOR SEPARATION

[75] Inventor: Makoto Hirosawa, Kyoto, Japan

[73] Assignee: Dainippon Screen Mfg. Co., Ltd., Japan

[21] Appl. No.: 193,829

[22] Filed: May 12, 1988

[30] Foreign Application Priority Data

May 15, 1987 [JP] Japan .................................. 62-119339

[51] Int. Cl.⁴ ........................ H04N 1/46; H04N 9/097
[52] U.S. Cl. ........................................ 358/75; 358/55; 350/173
[58] Field of Search ............................. 358/75, 50, 55; 350/173, 172, 171

[56] References Cited

U.S. PATENT DOCUMENTS

| | | | |
|---|---|---|---|
| 3,922,069 | 11/1975 | Kishikawa et al. | 358/50 |
| 4,005,285 | 1/1977 | Price | 250/578 |
| 4,262,305 | 4/1981 | Sekiguchi et al. | 358/55 |
| 4,425,577 | 1/1984 | Bergen et al. | 358/55 |
| 4,507,679 | 3/1985 | Bendell | 358/55 |
| 4,641,920 | 2/1987 | Matsuoka et al. | 350/173 |
| 4,642,679 | 2/1987 | Nagano | 358/75 |
| 4,644,390 | 2/1987 | Ochi | 358/55 |

FOREIGN PATENT DOCUMENTS

| | | |
|---|---|---|
| 0124379 | 9/1980 | Japan . |
| 0030381 | 3/1981 | Japan . |
| 0072591 | 6/1981 | Japan . |
| 0055883 | 11/1987 | Japan . |
| 0092188 | 4/1988 | Japan . |
| 0097080 | 4/1988 | Japan . |

Primary Examiner—James J. Groody
Assistant Examiner—W. Kimyen
Attorney, Agent, or Firm—Ostrolenk, Faber, Gerb & Soffen

[57] ABSTRACT

A spectroscope (20) and a multi-row image sensor (40) are fixed to each other. Light from an original is supplied through an image-formation optical system to a spectroscope, which in turn separates the light into a plurality of color light components (LR, LG, LB). the color light components form linear images on light receiving surfaces of linear image sensors (42R, 42G, 42B) respectively. Respective image-formation positions of the color light components have a common conjugate position (P).

5 Claims, 10 Drawing Sheets

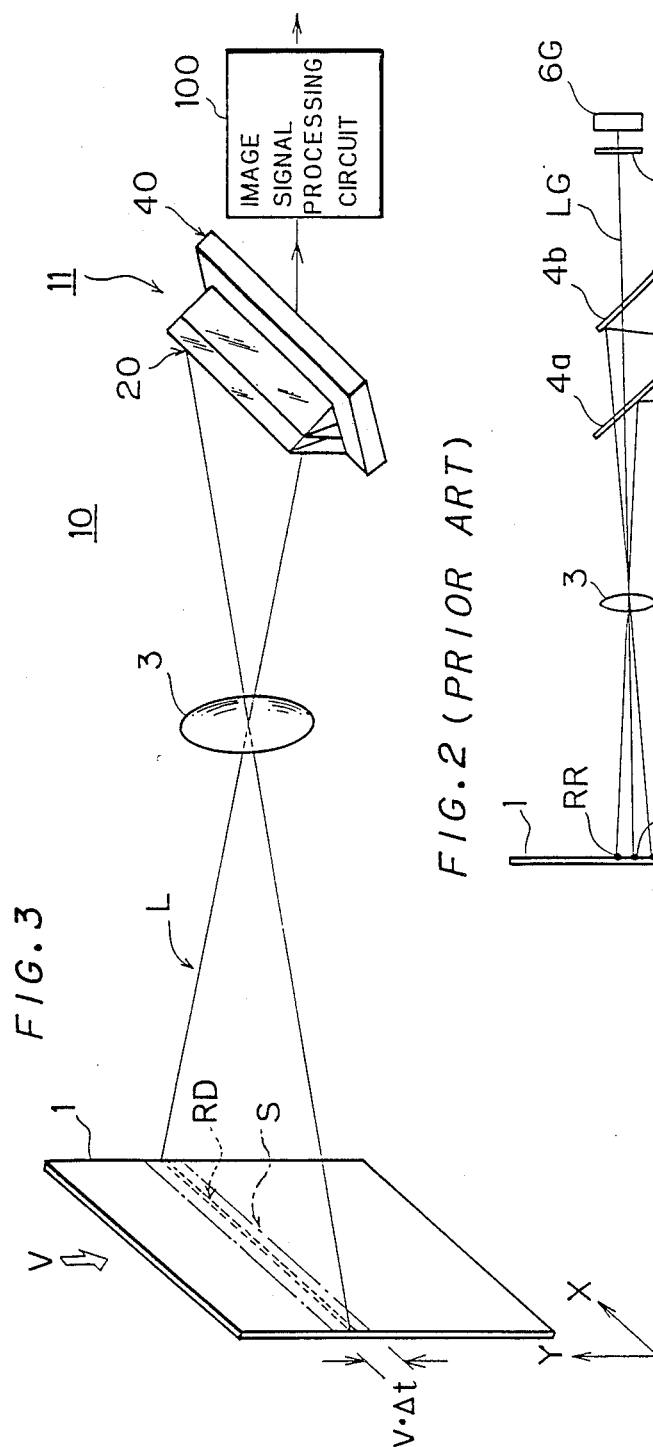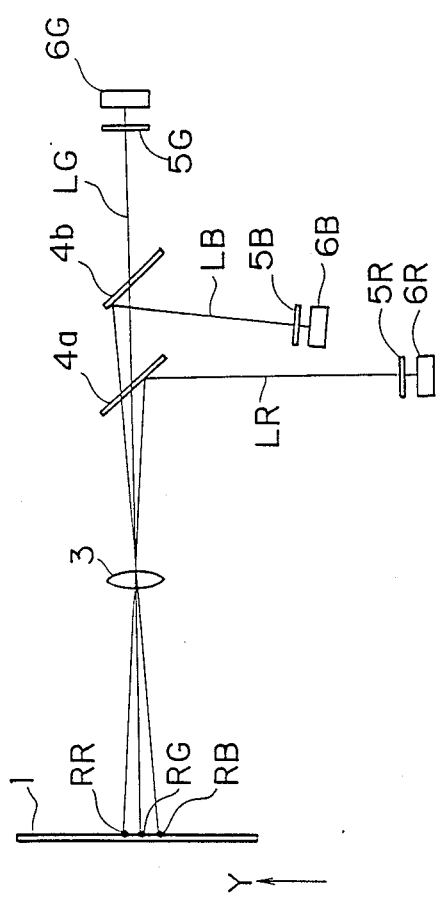

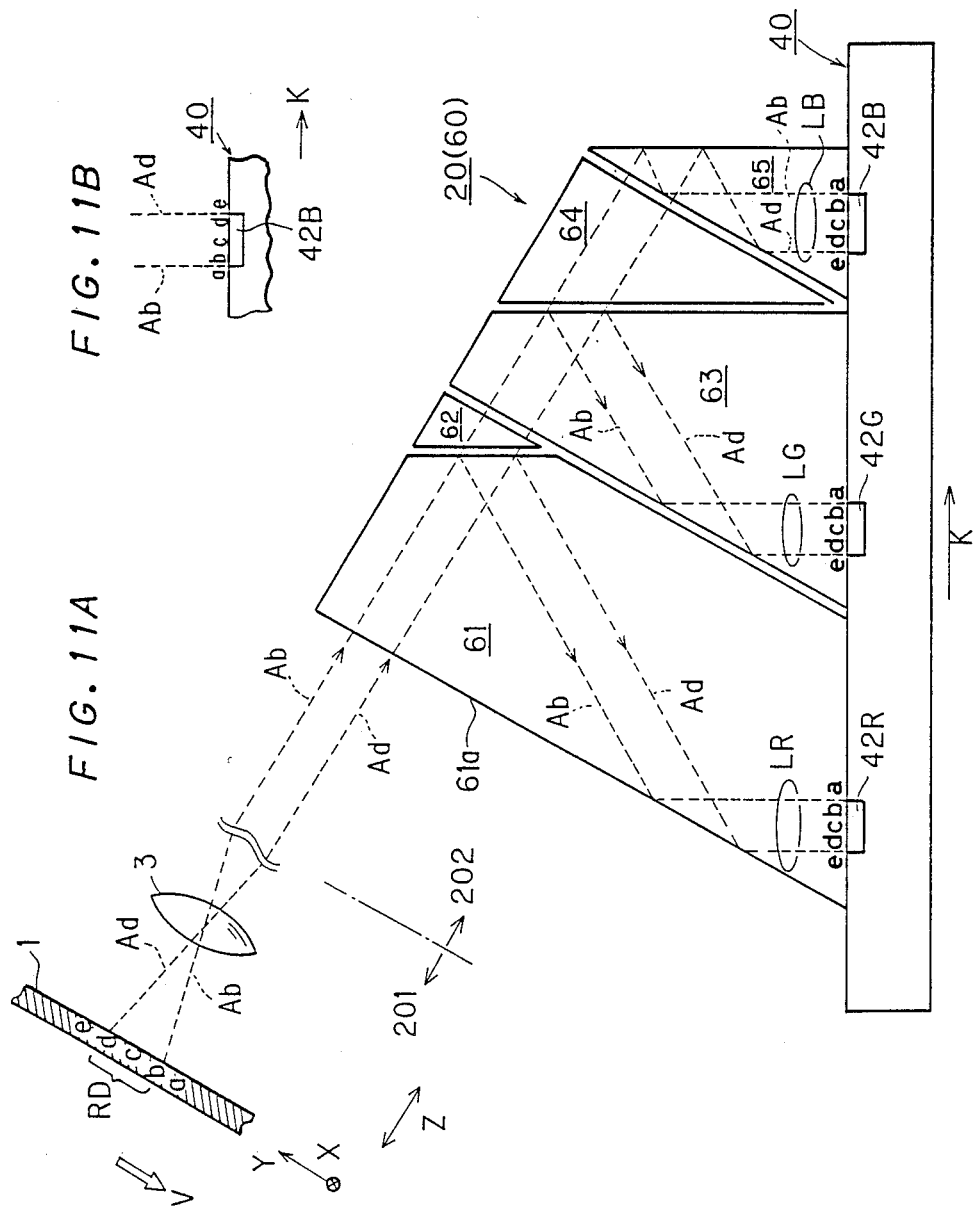

IMAGE READER HAVING SPECTROSCOPE FOR COLOR SEPARATION

BACKGROUND OF THE INVENTION

1. Field of the Invention

The present invention relates to an image reader for separating light from an image of an original into a plurality of color light components to read the same by a plurality of linear image sensors, and more particularly, it relates to a system which precludes misalignment between respective elements of the reader so that there is no reduction in picture quality.

2. Description of the Prior Art

In a process color scanner or the like, an image of an original must be read sequentially along scanning lines for each color component of light from the original image. Thus, such system, employ an image reader to separate light from the original into three color components, i.e., red, blue and green, and to photoelectrically convert the same into electrical signals by respective linear image sensors.

FIG. 1 illustrates a conventional image reader 2. The image reader 2 has an image-formation lens system 3. Light L from a read line RD enters the image reader 2 through the image-formation lens system 3.

The light L is separated in three directions by first and second half mirrors 4a and 4b to provide three image-formation beams $l_R$, $l_B$ and $l_G$. Filters 5R, 5B and 5G for extracting the red, blue and green components are provided along the paths of the image-formation beams $l_R$, $l_B$ and $l_G$ respectively. Linear image sensors 6R, 6B and 6G are provided behind the filters 5R, 5B and 5G, respectively. In order to read intensity levels of red, blue, and green components respectively supplied through the filters 5R, 5B and 5G, each of the linear image sensors 6R, 6B and 6G is provided with a one-dimensional array of light receiving cells 7.

Referring to FIG. 1, the image sensor 2 and the original 1 are moved with respect to each other along a subscanning direction Y at a velocity V. Light from a strip-shaped region S is received by the respective linear image sensors 6R, 6B and 6G during a prescribed time $\Delta t$. Thus, the region S defines a single scanning line having a width of $(V \cdot \Delta t)$. The entire image of the original 1 is sequentially scanned and read by sustaining the relative movement between the original 1 and the image reader 2 while repeating image reading for each scanning line.

When misalignment occurs between the linear image sensors 6R, 6B and 6G and the half mirrors 4a and 4b in the image reader 2, lines to be read by the linear image sensors 6R, 6B and 6G are displaced. FIG. 2 illustrate such a state, in which the respective linear image sensors 6R, 6B and 6G take in image data from different read lines RR, RB and RG, although they should read image data from the same line. As a result, degradation in picture quality (such as color deviation) is caused when an image is reproduced by combining data read by the misaligned image sensors 6R, 6B and 6G.

Such misalignment is not only caused when the apparatus is assembled, but can also be caused after assembly by thermal expansion of respective members or mechanical deformation in transportation, etc. Thus, it is difficult to prevent picture quality degradation. Indeed, picture quality degradation caused by misalignment can be caused even if the elements constituting the image sensor are carefully assembled and adjusted. Furthermore, since it is the read position of the original 1 itself which is deviated by misalignment, a quality image cannot be reproduced even if signal processing techniques such as color masking are employed.

The problem is typically encountered when highly accurate image reading is required such as during process color scanning. However, the problem also exists in other apparatuses for reading color images, such as a color facsimile and a color copying apparatus.

SUMMARY OF THE INVENTION

The present invention is directed to an image reader which includes a spectroscope; means for directing light to be imaged into the spectroscope; and first, second, and third image sensors located adjacent the spectroscope. The spectroscope includes a plurality of transparent bodies located immediately adjacent one another. The transparent bodies have color selective reflective surfaces formed thereon. The shape of the transparent bodies and the location of the color selective reflective surfaces is such that light directed into the spectroscope is broken up into first, second, and third color components and the components are directed to the respective image sensors.

The present invention is also directed to a system for separating light into components of different colors and for sensing the intensity of said components. The system includes a spectroscope formed of transparent bodies. The transparent bodies are fixedly assembled together as a unit to prevent misalignment between said transparent bodies. The spectroscope further includes a transparent surface for allowing light to enter the interior of the spectroscope; means for separating the light within the interior of the spectroscope to form components of different colors; and means for directing the components out of the spectroscope. The system further includes a device for receiving the components directed out of the spectroscope and for sensing the intensity of the components. The device is fixed to and integrated with the spectroscope to prevent misalignment between the device and the spectroscope.

The present invention is also directed to an image reader for separating light from an original image into color light components and for receiving the color light components by linear image sensors to read each scanning line of an original image. According to the present invention, the image reader comprises: (a) an image-formation optical system for converting light from the original image into image-formation light; (b) a spectroscope having assembled transparent bodies having: (b-1) a light incident plane through which the image-formation light enters an interior of the spectroscope, (b-2) color separation planes for selectivity reflecting the image-forming light in the interior of the spectroscope thereby to separate the image-formation light into color light components, (b-3) optical axis direction changing means for reflecting the color light components to direct optical axes of the color light components to prescribed image-formation positions having a common conjugate position, respectively, and (c) an image sensing device fixed to the spectroscope and having linear image sensors for receiving the color light components, respectively. The image-formation positions are present on respective light receiving surfaces of the linear image sensors and the optical axes of the color light components are perpendicular to the light receiving surfaces, respectively.

Even if misalignment is caused between the image-formation optical system and the spectroscope, light from a common position of the original image forms linear images on the image formation positions of the respective color light components since the image forming positions of the respective color light components have a common conjugate position. Since the spectroscope is fixed and integrated with the image sensing device, no misalignment can occur between the spectroscope and the image sensing device. Since the optical axes of the color light components are perpendicular to the light receiving surfaces of the linear image sensors color deviation of a reproduced image caused by misalignment can be prevented.

According to a preferred embodiment of the present invention, the light incident plane is substantially perpendicular to an optical axis of the image-formation light, and the color light components are totally reflected on the optical axis direction changing planes.

According to the aspect of the present invention, the image sensing device is a multi-row image sensor which is formed by providing linear image sensors on one surface of a common substrate and parallel to each other.

Accordingly, an object of the present invention is to provide an image reader which does not permit quality of a reproduced image to be deteriorated because of misalignment between respective members.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 1 and 2 are explanatory diagrams of the conventional image reader described above;

FIG. 3 is a perspective arrangement diagram showing a first embodiment of the present invention;

FIGS. 11A and 11B are explanatory diagrams of the second embodiment of the invention.

DETAILED DESCRIPTION OF THE PREFERRED EMBODIMENTS

A. Structure of First Embodiment

Figure 1:
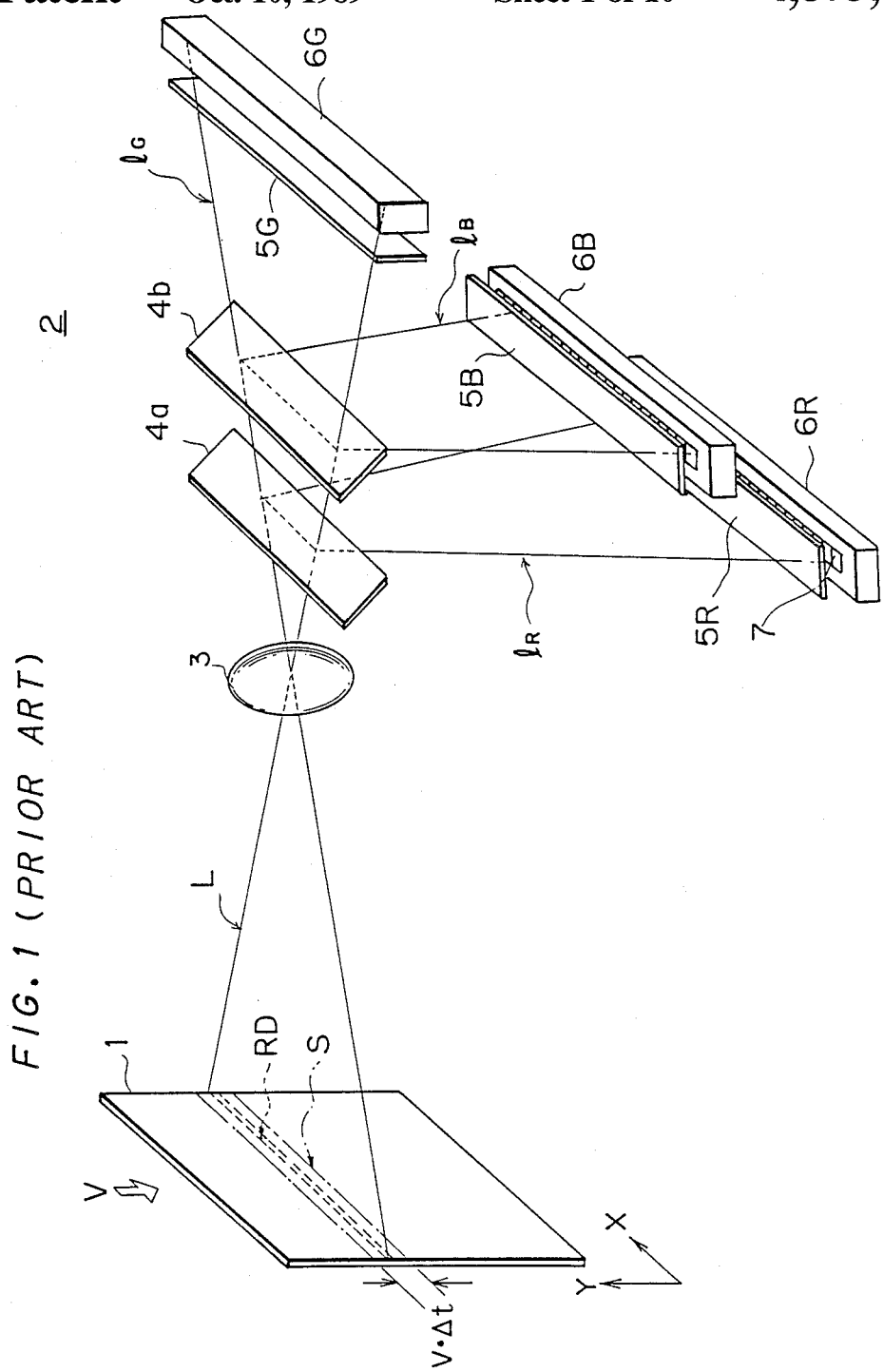

FIG. 3 is a perspective arrangement diagram showing an image reader 10 according to a first embodiment of the present invention.

In this image reader 10, light L from an image of an original 1 is converted into image-formation light by an image-formation optical lens system 3, to be supplied to a spectrodetector 11. The spectrodetector 11 is formed by integrating a spectroscope 20 and a multi-row image sensor 40.

Figure 4:
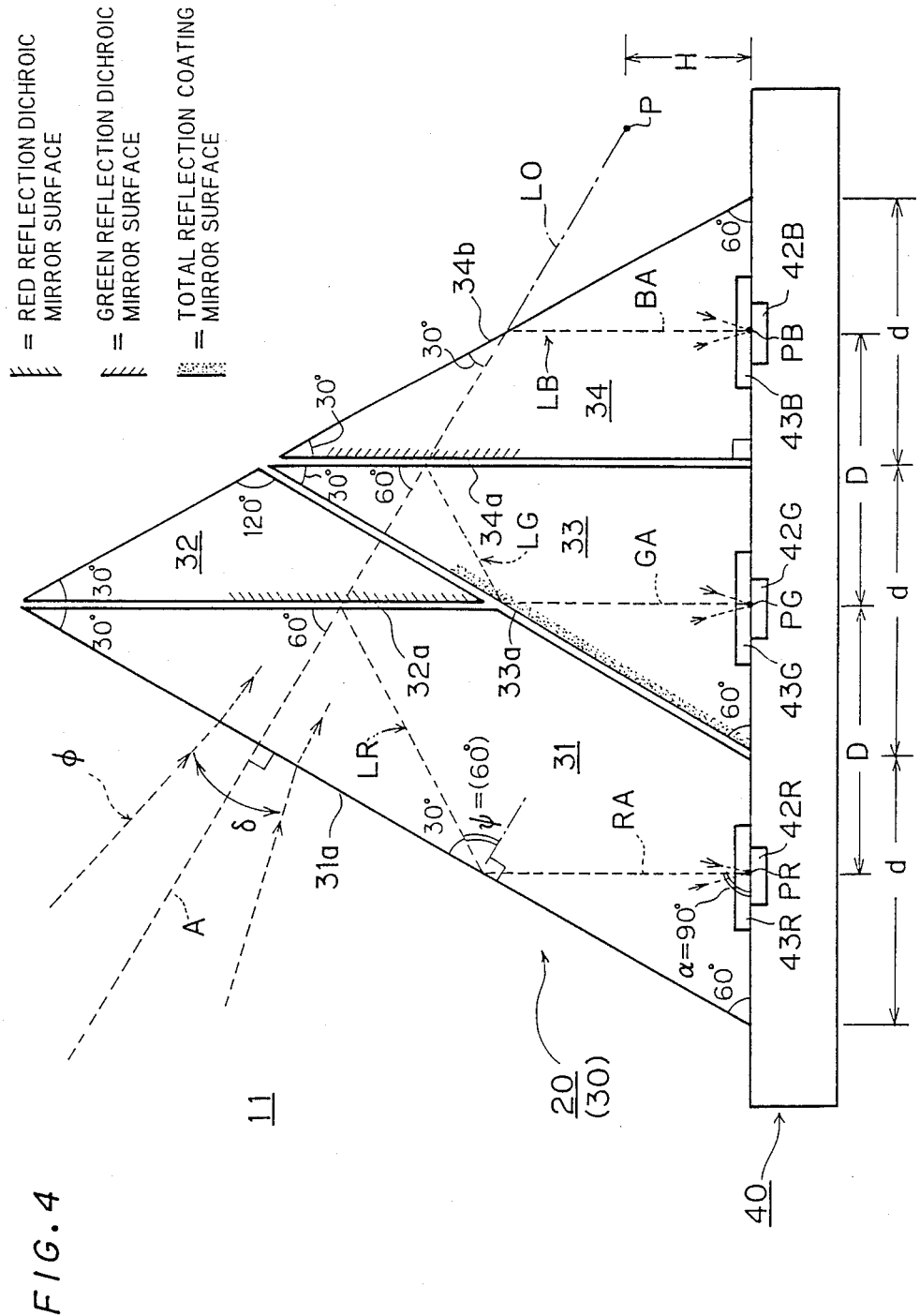
FIG. 4 is a partially enlarged view showing the first embodiment.

FIG. 4 shows the detailed structure of the spectrodetector 11. The spectroscope 20 is formed as a transparent element coupled body 30. Light reflection treatment is performed on the surfaces of four polygonal-prismatic transparent bodies 31 to 34 and the bodies 31 to 34 are adhesively coupled to each other. Although small clearances between surfaces of adjacent transparent bodies 31 to 34 are shown in FIG. 4 for convenience of illustration, the surfaces are, in practice, tightly adhered to each other. Any air or the like is excluded from between the surfaces. This applies to other embodiments hereinafter described. Each of the transparent bodies 31 to 34 is made of transparent glass, or transparent plastic, crystal or the like.

The first transparent body 31 is in the form of a square pole extending in a direction perpendicular to the plane of the drawing. The other transparent bodies 32 to 34 are triangular poles extending in the same direction. All apex angles of the transparent bodies 31 to 34 are multiples of 30°. Thus, the entire body 30 is in the form of an equilateral triangle pole.

On the surfaces of the transparent bodies 31 to 34 shown in FIG. 4, regions indicated in parallel slanting lines or the like are a red reflection dichroic mirror surface, a green reflection dichroic mirror surface and a total reflection coating surface (referred to hereinafter as "red reflection surface", "green reflection surface" and "total reflection surface", respectively). The variously required surface reflection treatments are shown in the row "FIG. 4" in Table 1, where symbol * indicates surfaces which must be partially subjected to the reflection treatment. The other surfaces may be either entirely or partially subjected to such reflection treatment.

TABLE 1

Figure 8:
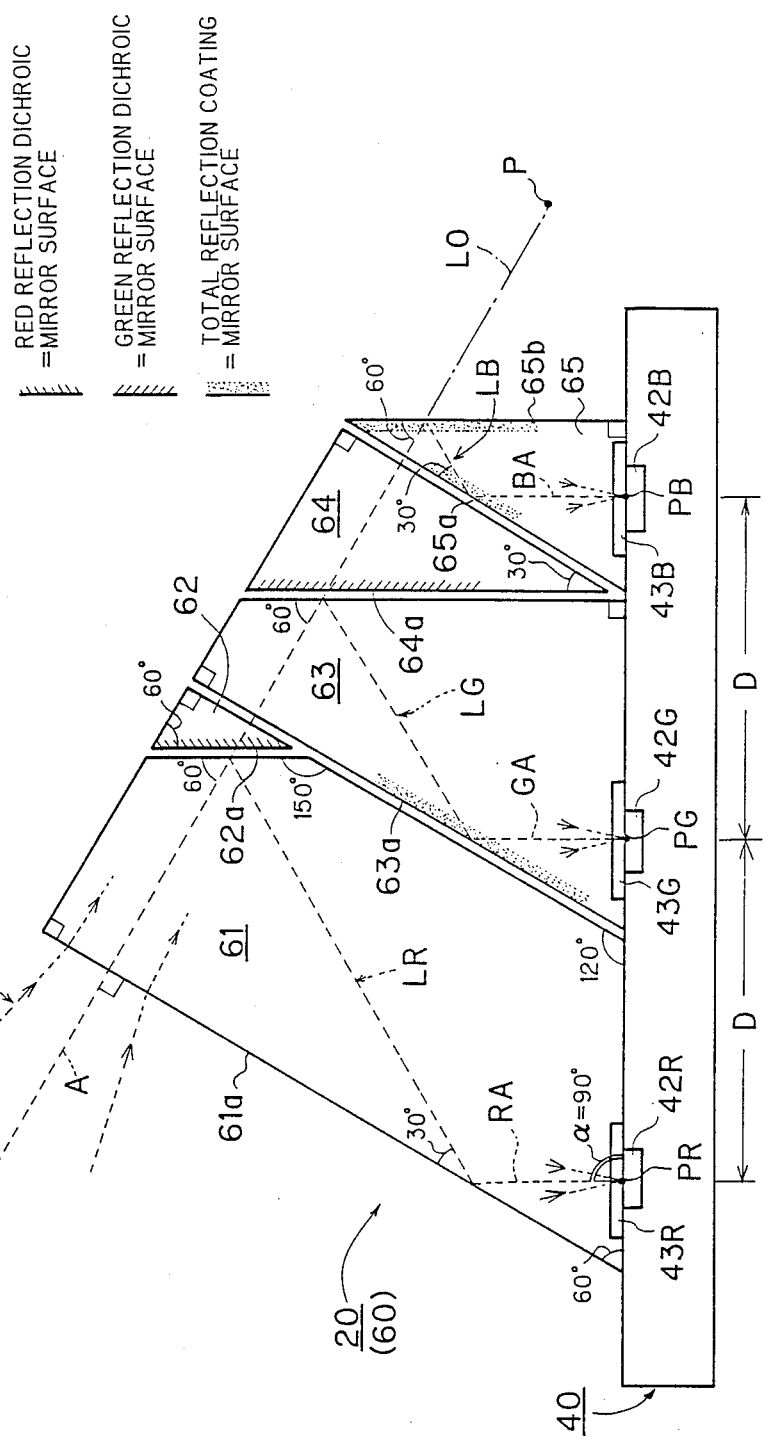
FIGS. 8, 9 and 10 are partial diagrams showing second, third and fourth embodiments of the invention respectively.
Figure 9:
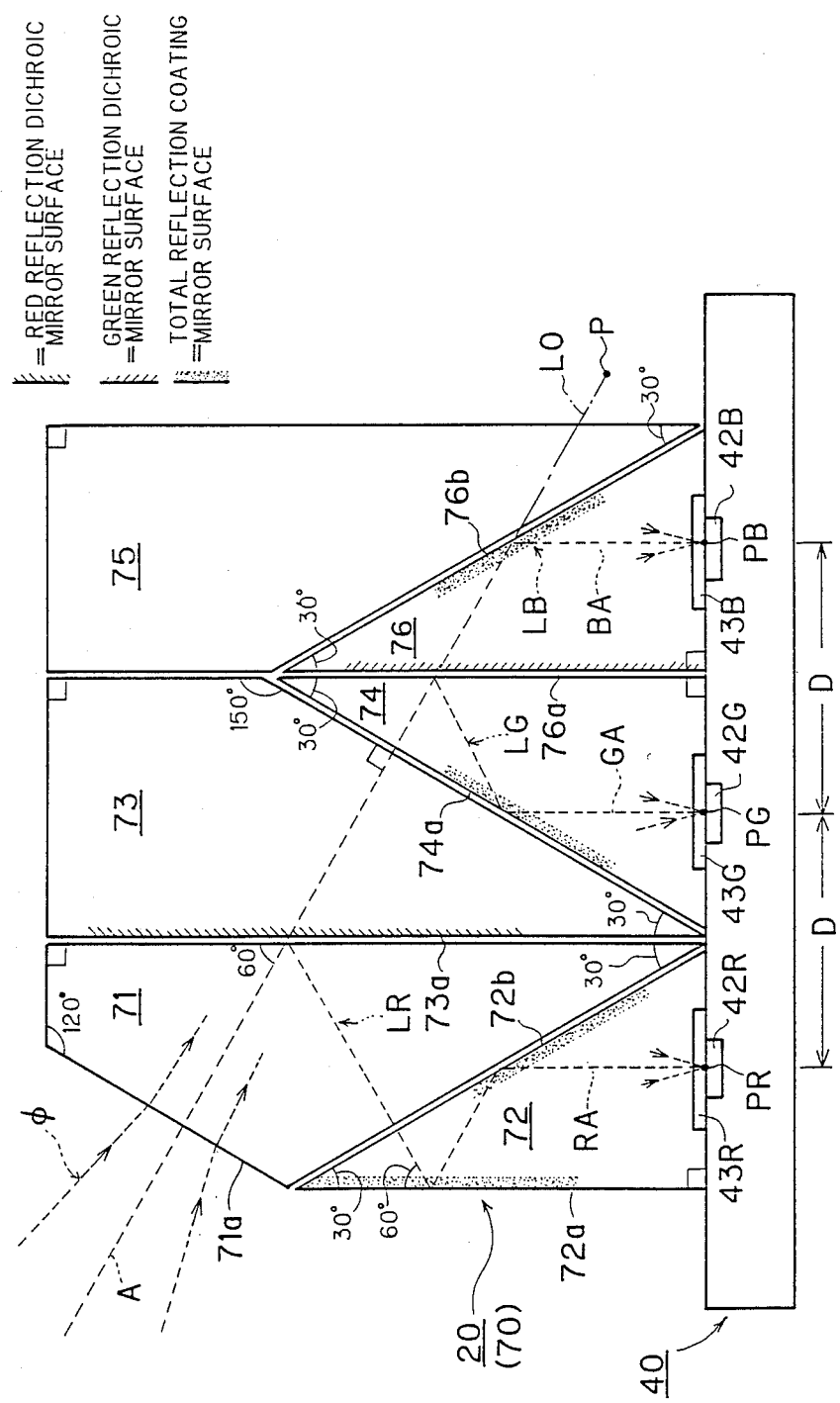
Figure 10:
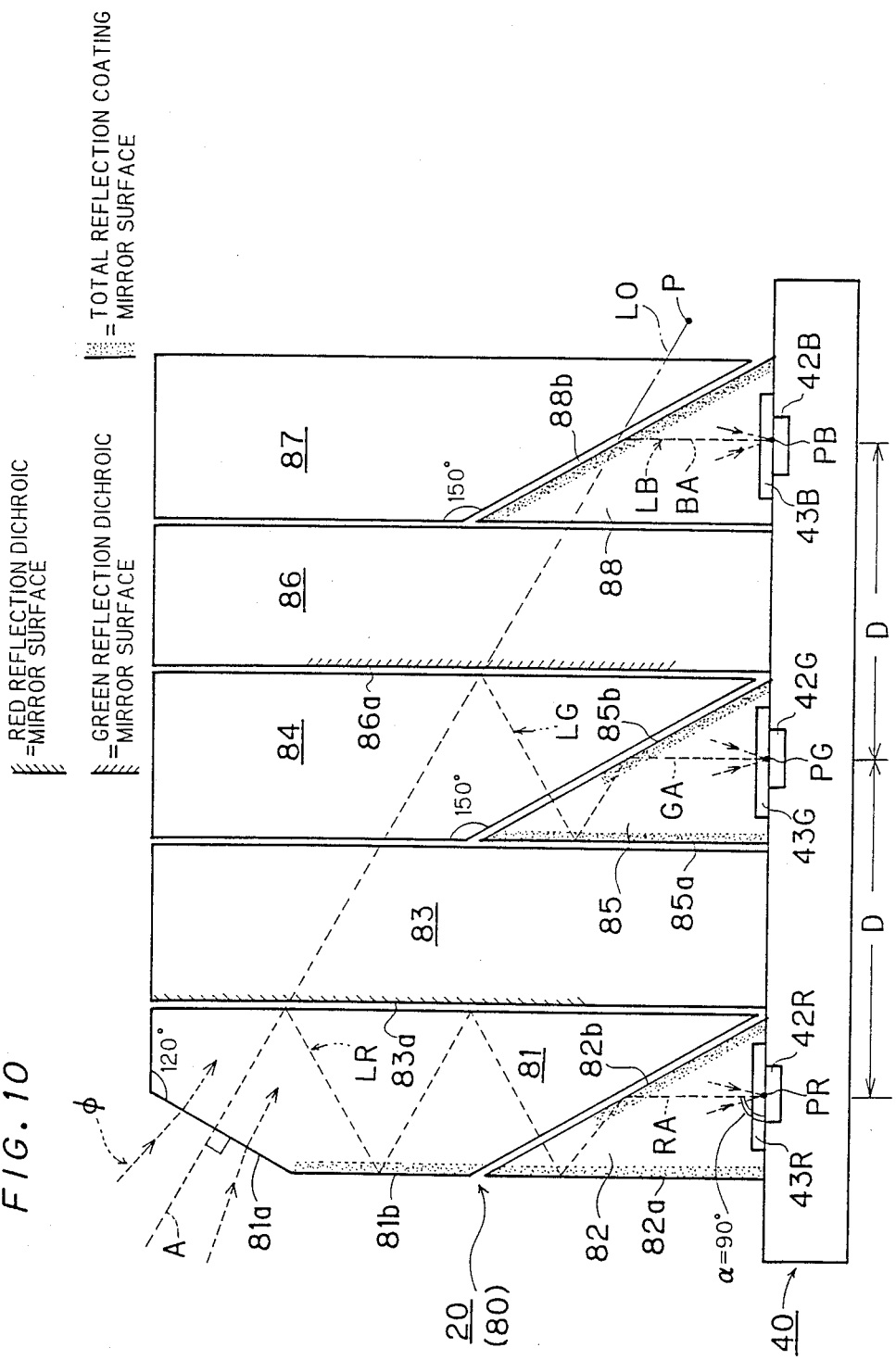

|         | red reflection surface | green reflection surface | total reflection surface |
|---------|------------------------|--------------------------|--------------------------|
| FIG. 4  | 32a                    | 34a                      | 33a*                     |
| FIG. 8  | 62a                    | 64a                      | 65a*                     |
|         |                        |                          | 66b                      |
| FIG. 9  | 73a                    | 76a                      | 72a                      |
|         |                        |                          | 72b*                     |
|         |                        |                          | 74a*                     |
|         |                        |                          | 76b                      |
| FIG. 10 | 83a                    | 86a                      | 81b                      |
|         |                        |                          | 82a                      |
|         |                        |                          | 82b*                     |
|         |                        |                          | 85a                      |
|         |                        |                          | 85b*                     |
|         |                        |                          | 88b                      |

Concerning remaining surfaces, light transmitting parts thereof are treated with an anti-reflection coating. This is also also the case in the embodiments of FIGS. 7 to 10 (hereinafter described).

The spectroscope 20 is arranged such that an optical axis A of image-formation light or light flux $\phi$ having passed through the image-formation lens system 3 is perpendicular to a surface 31a of the first transparent body 31. Thus, the surface 31a serves as a light incident plane through which the flux $\phi$ enters into the body 31. The surface 31a is one of a plurality of outer peripheral surfaces of the spectroscope 20.

The light that enters the spectroscope 20 through the surface 31a reaches a surface 32a of the second transparent body 32 and only a red component of the light is reflected by the surface 32a. Of light components of the propagating in the interior of the coupled body 30, generally only a light beam propagating along its optical axis is shown in FIG. 4 (and FIGS. 7 to 10), for convenience of illustration. The embodiments will be further described with reference only to the light beam propagating along its optical axis, unless particularly noted.

A red light component LR thus separated from the incident light impinges on the surface 31a from inside the transparent body 31. An impinging angle ψ at which the red light component LR impinges on the surface 31a is 60°. Therefore, the red light component LR is totally reflected by the surface 31a at a reflection angle of 60°, to propagate downwardly and perpendicularly impinge on a light receiving surface of a linear image sensor 42R. The red light component LR forms a linear red image at an image formation position PR on the light receiving surface.

Light passing through the surface 32a of the second transparent body 32 linearly passes through the interiors of the second and third transparent bodies 32 and 33 to reach a surface 34a of the fourth transparent body 34. Only a green component of light is reflected by the surface 34a. A green light component LG separated from the light is totally reflected by a surface 33a of the third transparent body 33 to propagate downwardly. This green light component LG forms a linear green image at a position PG on a linear image sensor 42G. The image-formation position PG is present on a light receiving surface of the linear image sensor 42G. It maybe easily understood by those skilled in the art that the green light component LG is also reflected by the total reflection surface 33a at the angle of 60°, to perpendicularly impinge on the light receiving surface of the linear image sensor 42G.

Further, light passing through the surface 34a of the fourth transparent body 34 (i.e., a blue light component LB) is totally reflected by another surface 34b of the fourth transparent body 34 to propagate downwardly. The blue light component LB perpendicularly impinges on a light receiving surface of a linear image sensor 42B in an image-formation position PB of the image sensor 42B (as in the cases of the red light component LG and the green light component LG) to form a linear blue image. The position PB is present on the light receiving surface of the linear image sensor 42B.

Since the light flux φ, after entering the body 30, reflected therein but is not subjected to refraction or the like, the virtual image-formation position P of the light flux φ serves as a common conjugate position of the image-formation positions PR, PG and PB. This conjugate position P is taken as a "conjugate point" with respect to a point in the image, while as a "conjugate line" with respect to one line in the image. In other words, an optical path LO directed toward the conjugate position P serves as a conjugate optical path that is common to the respective optical paths of the light components LR, LG and LB.

The image-formation positions PR, PG and PB are spaced on a common plane. Since the first, third and fourth transparent bodies 31, 33 and 34 have equal lengths d, the positions PR, PG and PB are spaced at regular intervals. Such situation is also shown in FIG. 5.

Figure 5:
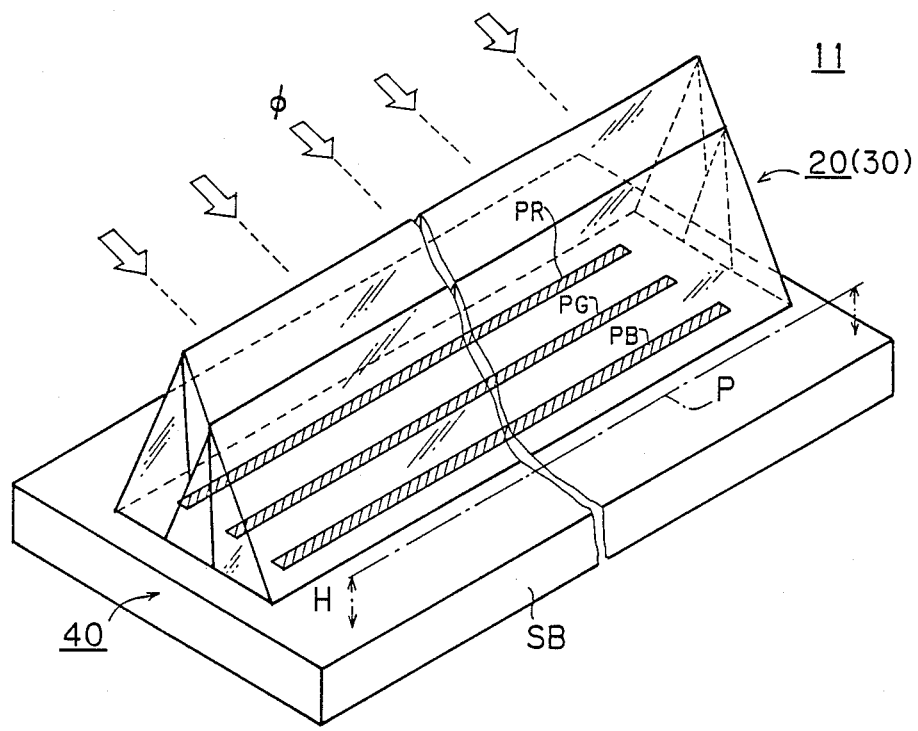
FIG. 5 illustrates image-formation positions of respective color light components and a conjugate position thereof.

In FIGS. 4 and 5, symbol H indicates the amount of common vertical displacement between the conjugate position P and the image-formation positions PR, PG and PB. The optical axes RA, GA and BA of the respective color light components LR, LG and LB are parallel to one another when they reach the respective linear image sensors 42R and 42G and 42B, are perpendicular to the bases of the first, third and fourth transparent bodies 31, 33 and 34.

Figure 6:
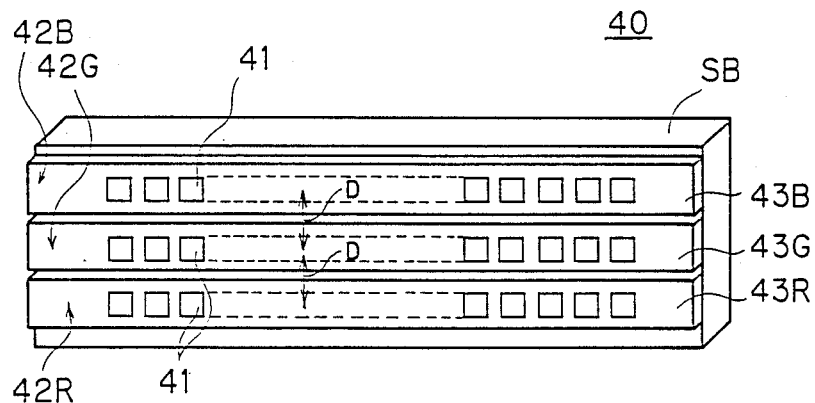
FIG. 6 is an explanatory diagram showing a multi-row image sensor.

As shown in FIG. 6, a multi-row image sensor 40 is formed by integrating three linear image sensors 42R, 42G and 42B together in parallel on the same plane. Each of the linear image sensors 42R, 42G and 42B has a one-dimensional array of light receiving cells 41. The linear image sensors 42R, 42G and 42B are adapted to respectively receive the red light component, the green light component and the blue light component for one line in the main scanning direction for each pixel. The linear image sensors 42R, 42G and 42B are formed on a common substrate SB so as to be parallel to one another. Red, green, and blue filters 43R, 43G, and 43B are fixed on the surfaces of the respective cell arrays. Employment of the red, green and blue filters 43R, 43G and 43B is not necessarily required but these filters 43R, 43G and 43B are preferably employed in order to obtain preferable color separation characteristics in a reproduced image.

The center-to-center spacing D among the respective linear image sensors 42R and 42B is made identical to the base length d of the respective transparent bodies 31, 33 and 34. As shown in FIG. 4, the multi-row image sensor 40 is fixed to and integrated with the spectroscope 20 such that rows of respective light receiving cell surfaces of the linear image sensors 42R, 42G and 42B are located in the image-forming positions PR, PG and PB of the respective color light components. Therefore, the color light components LR, LG and LB exit the spectroscope 20 through a junction surface between the spectroscope 20 and the multi-row image sensor 40. Thus, linear images are formed on a light receiving surface immediately after exiting the spectroscope.

Since the optical axes RA, GA and BA of the respective color light components LR, LG and LB are perpendicular to the bases of the first, third and fourth transparent bodies 31, 33 and 34, light receiving surfaces of the linear image sensors 42R, 42G and 42B are present on a common plane and are perpendicular to the optical axes RA, GA and BA respectively.

Referring to FIG. 3, the image reader 10 and the original 1 are moved with respect to each other along the subscanning direction Y at the velocity V. Such movement is effected by a scanning driving mechanism (not shown). The read line RD is defined by a linear region on the original 1 being read by the multi-row linear image sensor 40. The read line RD is moved on the surface of the original 1 along the direction Y by V·Δt in a prescribed time Δt, thereby to define a scanning line S. Image information from the scanning line S is read by the multi-row image sensor 40. The respective three one-dimensional arrays of light receiving cells in the multi-row image sensor 40 are serially accessed by an image signal processing circuit 100, whereby main scanning of the original 1 is achieved. The one-dimensional arrays are periodically accessed while moving the original 1 in a direction shown by an arrow V, thereby to effect subscanning of the original 1. The image signal processing circuit 100 applies processing techniques such as gradation correction, for example, to the image information from the multi-row image sensor 40, and an output signal thereof is supplied to a halftone dot recorder (not shown), for example. The image signal processing circuit 100 may be constructed of various well-known circuits.

B. Characteristics of First Embodiment

As hereinabove described, the image-formation light $\phi$ is separated into color light components LR, LG and LB which are guided to and received by the linear image sensors 42R, 42G and 42B. The spectroscope 20 and the multi-row image sensor 40 (i.e., the spectroscope 20 and the linear image sensors 42R, 42G and 42B) are integrated with each other. Therefore, no misalignment can occur between the spectroscope 20 and the linear image sensors 42R, 42G and 42B, and quality deterioration of an image caused by such misalignment can be prevented.

Since the image-formation positions PR, PG and PB have the common conjugate position P, image formations in the image-formation positions PR, PG, and PB are equivalent to the conjugate position P. Therefore, even if misalignment takes place between the original 1, the image-formation lens system 3 and the spectrodetector 11 and displacement of a formed image occurs, (i.e., displacement of position of the read line RD), this displacement affects the linear image sensors 42R, 42G and 42B equally, and no read deviation is caused thereby. Consequently, the linear image sensors 42R, 42G and 42B detect a common image even if misalignment occurs between the original 1, the lens system 3 and the spectrodetector 11.

For the aforementioned reasons, the quality of an image is not deteriorated by misalignment in the apparatus of the present invention. Further, the apparatus is compacted and the optical system thereof is relatively simplified since the spectroscope 20 is integrated with the linear image sensors 42R, 42G and 42B.

In the spectroscope 20 shown in FIG. 4, the incident plane 31a of the light $\phi$ is orthogonal to the optical axis of the light $\phi$. Further, the color light components LR, LG and LB are reflected on the surfaces 31a, 33a and 34b, respectively, whereby the optical axes RA, GA and BA are perpendicular to the in image formation on the respective light receiving surfaces of the linear image sensors 42R, 42G and 42B.

Figure 7:
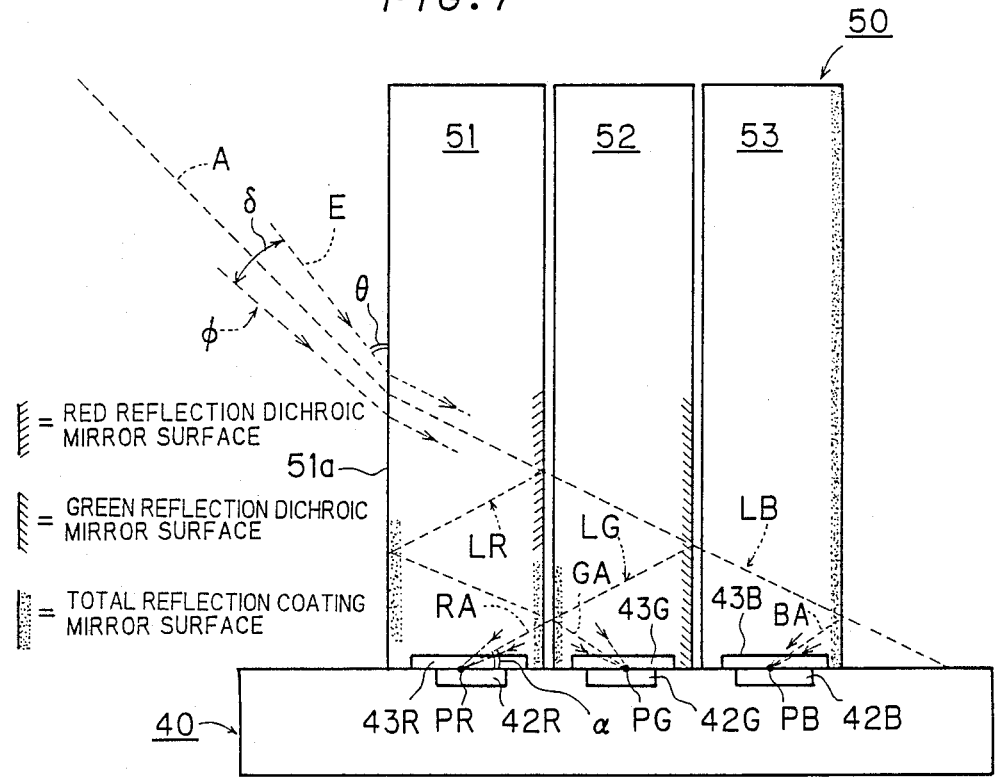
FIG. 7 is a partial diagram showing related art.

In order to clarify the advantages of such perpendicular light incidence and perpendicular light receiving, a spectroscope 50 shown in FIG. 7 will be explained as a related art which is not prior art. The spectroscope 50 is formed by performing light reflection treatment on surfaces of three parallel transparent plates 51 to 53 as illustrated in FIG. 7 and adhering the same to each other. This spectroscope 50 is integrated with a multi-row image sensor 40. An image-formation light $\phi$ enters the spectroscope 50 so that is optical axis A is at a prescribed angle of approximately 45° with respect to a surface 51a, and color light components LR, LG and LB propagate to respective light receiving surfaces of linear image sensors 42R, 42G and 42B, respectively, so as to form respective linear images. In this technique, the spectroscope 50 is advantageously integrated with the multi-low linear image sensor 40 as in the embodiment shown in FIG. 4, yet the following problem arises:

When the spread angle $\delta$ of the light flux $\phi$ is increased, an angle $\theta$ made by an edge portion E of the light $\phi$ with the surface 51a (light incident plane) is considerably reduced. The refractive index of glass is larger than that of air, and the spectroscope 50 has a finite total reflection critical angle (about 42°) in its inner side. When light in the vicinity of the edge portion E enters the surface 51a at an incidence angle approaching horizontal incidence, the light in the vicinity of the edge portion E chiefly enters the spectroscope at an incident angle which is close to the critical angle, and this light cannot effectively form an image on the light receiving surfaces of the linear image sensors 42R, 42G and 42B. Therefore, the structure shown in FIG. 7 cannot accommodate a large spread angle $\delta$. In the spectroscope 50, angles of incidence of the light components LR, LG and LB on the linear image sensors 42R, 42G and 42B are large, i.e., the angle $\alpha$ shown in FIG. 7 is small. Thus, the efficiency of light incidence on the light receiving surfaces is low and the image sensors are easily susceptible to misregistration.

On the contrary, substantially no deviation in image formation is caused in the spectroscope 20 shown in FIG. 4 even if the spread angle $\delta$ is increased to some extent because the optical axis A of the image-formation light $\phi$ is perpendicular to the incident plane, i.e. the surface 31a. Further, the optical axes RA, GA and BA of the respective color light components LR, LG and LB are perpendicular to the light receiving surfaces of the linear image sensors 42R, 42G and 42B by reflection on the surfaces 31a, 33a and 34b. Thus, efficiency of light incidence is increased and substantially no adverse effect can be caused by misregistration.

Thus, the spectroscope 20 shown in FIG. 4 can avoid the adverse effects caused, in the prior art, by misalignment. The spectroscope 20 also has the aforementioned other advantages. These advantages are also obtained by the second to fourth embodiments (hereinafter described).

C. Second, Third and Fourth Embodiments

FIGS. 8, 9 and 10 illustrate the second to fourth embodiments of the present invention, respectively. These partial diagrams correspond to FIG. 4 and the second to fourth embodiments are identical in many respects to the first embodiments. Only parts which are different from those of the first embodiment will be described below.

In the second embodiment shown in FIG. 8, a spectroscope 20 is formed by a transparent element coupled body 60 which includes first to fifth transparent bodies 61 to 65. Light reflection treatment as shown in FIG. 8 is performed on surfaces of the bodies 61 to 65 and the bodies are adhesively coupled to one another. The transparent body 61 is a pentagonal pole and the transparent body 63 is a square pole, and the transparent bodies 62, 64 and 65 are triangular poles. The entire body 60 is in the form of a trapezoidal pole. Table 1 shows the details of the various surface reflection treatments of the transparent bodies.

In the third embodiment shown in FIG. 9, a spectroscope 20 is formed by a transparent element coupled body 70 obtained by coupling first to sixth transparent bodies 71 to 76. In the fourth embodiment shown in FIG. 10, a spectroscope 20 is formed by a transparent element coupled body 80 obtained by coupling first to seventh transparent bodies 81 to 87. Table 1 also shows details of surface reflection treatments performed to create these embodiments.

In the second to fourth embodiments, the surfaces listed in the first to third rows of the respective columns in Table 2 serve as light incident planes, color separation planes and optical axis direction changing planes, respectively. The "optical axis direction changing planes" are reflection planes for reflecting color light components LR, LG and LB along image-formation optical axes RA, GA and BA thereof to image-formation positions PA, GA and BA on light receiving surfaces of linear image sensors 42R, 42G and 42B. The reflection planes causes the optical axes RA, GA and BA to be perpendicular to the light receiving surfaces of the linear image sensors 42R, 42G and 42B. Table 2 also shows the functions of the respective planes or surfaces in the first embodiment.

TABLE 2

|  | FIG. 8 | FIG. 9 | FIG. 10 | FIG. 4 |
|---|---|---|---|---|
| light incident plane | 61a | 71a | 81a | 31a |
| color separation planes | 62a | 73a | 83a | 32a |
|  | 64a | 76a | 86a | 34a |
| optical axis | 61a | 72b | 82b | 31a |
| direction changing plances | 63a | 74a | 85b | 33a |
|  | 65a | 76b | 88b | 34b |

The light incident plane is one of the outer peripheral surfaces of the spectroscope 20, and the color separation planes are obtained by treating parts of interjunction planes between the transparent bodies. The optical axis direction changing surfaces are either on outer peripheral surfaces or interjunction surfaces between the transparent bodies. These embodiments have all of the advantages of the first embodiment although they are different in configuration and in the number of transparent bodies. All of the preferred embodiments function similarly and have similar effects. Optical paths for the light components LR, LG and LB are shown in FIGS. 8 to 10 to be easily understood by analogy to the first embodiment and hence redundant description is omitted.

The second embodiment shown in FIG. 8 also has another advantage when displacement of the spectroscope 20 occurs with respect to the multi-row image sensor 40. Referring to FIG. 11A, for purposes of clarifying the second embodiment, the linear image sensors 42R, 42G and 42B simultaneously receive light corresponding to range between points b and d on the surface of the original 1. In FIG. 11A, the distance in a direction Z in a region 201 is compressed for purposes of illustration. Hence, an angle defined by optical axes Ab and Ad in the region 201 is illustrated as being different from the angle in a region 202. In practice, the angles are equal to each other.

After the image-formation light enters the spectroscope 20 through the incident plane 61a of the transparent body 61, the components LR, LG and LB are reflected twice on the surfaces of the transparent bodies 61 to 65, to be supplied to the light receiving surfaces of the linear image sensors 42R, 42G and 42B, respectively. Since all of the color light components LR, LG and LB are reflected an even number of times (i.e., 2×n times where n is an integer), image-formation positions of the color components from the points b, c and d of the original 1 on the linear image sensors 42R, 42G and 42B are arrayed along a direction reverse to a direction K from the right to the left in FIG. 11A.

Assuming that the linear image sensors 42R, 42G and 42B are uniformly erroneously displaced in the direction K, a the junction between the multi-row image sensor 40 and the spectroscope 20. All of the linear image sensors 42R, 42G and 42B will receive light from a range between points c and e on the original 1. In other words, the aforementioned error causes reading deviation in a common direction in each of the linear image sensors 42R, 42G and 42B. Consequently, relation among respective read positions of the linear image sensors 42R, 42G and 42B is invariable and color deviation in a reproduced image is substantially prevented. This advantage is obtained whenever all of the color light components are reflected an even number times to enter the linear image sensors 42R, 42G and 42B after incidence thereof on the spectroscope 60. Alternatively, all of the color light components may be reflected an odd number of times. If one of the color light components is reflected an odd number of times and another component is reflected an even number of times, the aforementioned advantage cannot be obtained. For example, if the blue light component LB is reflected an odd number of times while the red light component LR and the green light component LG are reflected an even number of times, then directions of light receiving ranges on the linear image sensors 42R and 42G are similar to those in FIG. 11A, while the direction of a light receiving range on the linear image sensor 42B is reverse to that in FIG. 11A, as shown in FIG. 11B. As a result, when the multi-row image sensor 40 is displaced in the direction K with respect to the spectroscope 20, the linear image sensors 42R and 42G receive light within a range between the points c and e, while the linear image sensor 42B receives light in the range between the points a and c. Thus, the light receiving ranges for the red component and the green component are different from the light receiving range for the blue component and this cause color deviation in a reproduced image. Therefore, it is preferred that all of the color light components be reflected either an even number or an odd number of times to accommodate any junction error that may occur between the spectroscope 20 and the multi-row image sensor 40.

In each of the first to fourth embodiments, an angle formed by the optical axis A of the incident light $\phi$ and the multi-row image sensor 40 is 30° (not indicated). The color light components LR, LG and LB are reflected at the incident angle of 30° n times (n=0, 1, 2, ...) and are thereafter reflected at the optical axis direction changing planes at an incidence angle of 60° to impinge upon the image-formation positions PR, PG and PB. Therefore, various modifications may be considered based on the first to fourth embodiments. In each of the first to fourth embodiments, a relatively small number of transparent bodies in the form of triangle, square and pentagonal poles may be coupled with one another, to provide a very compact structure.

Figure 12A:
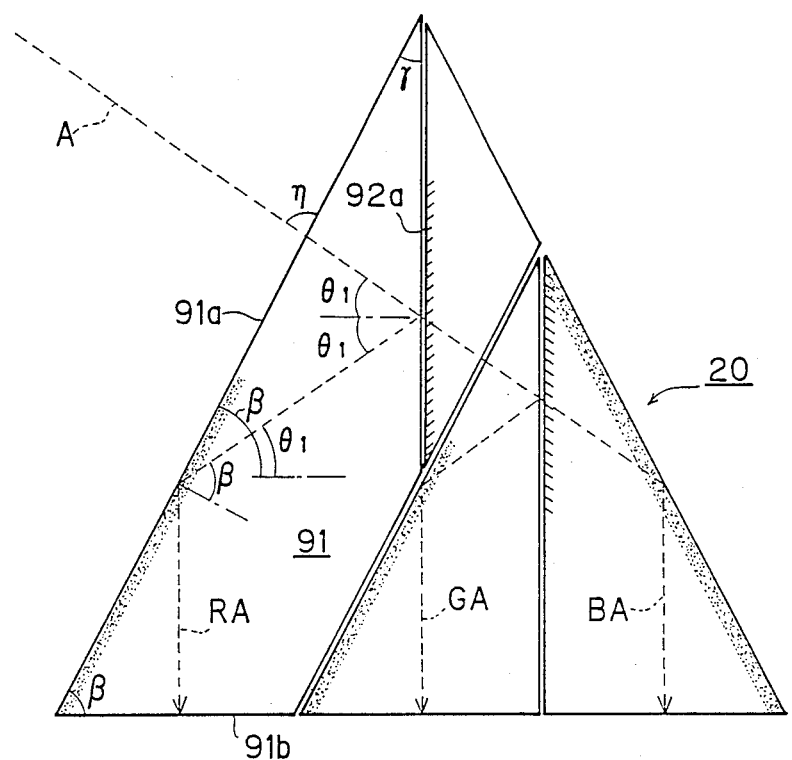
FIGS. 12A through 12C are partial diagrams showing a further embodiment of the invention.

The present invention can be also carried out by making the aforementioned angles other than 30° and 60°. In order to prove this, it is assumed, in the structure shown in FIG. 12A, symbol $\beta$ and symbol $\gamma$ represent apex angles of a transparent body 91 and symbol $\theta_1$ represents an incident angle of an optical axis A upon a reflection surface 92a, where $$\beta + \gamma = 90° \qquad (1)$$

In order to make an optical axis RA of a red light component perpendicular to a bottom surface 91b, it is necessary to make the optical axis RA of the red light component impinge on the surface 91a at the incident angle $\beta$. Through a geometrial analysis, we have:

$$2\beta - \theta_1 = 90° \qquad (2)$$

Since the equation (2) can be modified as $$\beta = (90° + \theta_1)/2 \qquad (3)$$

perpendicular incidence of the red light component upon the bottom surface 91b is effected by setting the angles β and θ₁ to satisfy the expression (3).

Therefore, if β≠60°, then θ₁≠30° according to the expression (3), and an angle η made by the optical axis A with the surface 91a is generally an angle other than 90°. Namely, so far as the relation between the angles β and θ₁ is set in accordance with the expression (3), the optical axis RA of the red light component can be made perpendicular to the bottom surface 91b (i.e., the light receiving surface) even if the light φ is not perpendicular to the light incident plane, i.e., the surface 91a. This also holds true to green and blue light components. Such modification may be performed in each of the aforementioned embodiments. Thus, the present invention can be carried out even if the optical axis of incident light is not perpendicular to the incident plane. An angle γ in FIG. 12A may be determined to satisfy:

$$\gamma = 90° - \beta = (90° - \theta_1)/2 \quad (4)$$

according to the expressions (1) and (3).

Figure 12B:
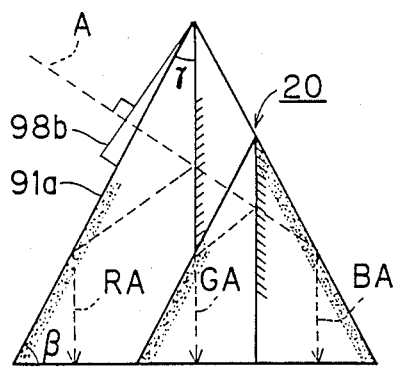
Figure 12C:
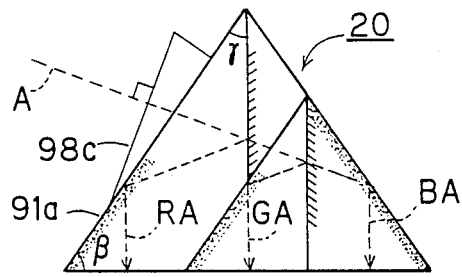

In examples shown in FIGS. 12B and 12C, triangular prisms 98b and 98c having required apex angles are mounted on a light incident plane constituting the surface 91a, to effect substantially perpendicular incidence upon the incident plane even if β≠60° and γ≠30°.

In the present invention, it is not essential to make the optical axes RA, GA and BA of the respective color light components exactly perpendicular to the light receiving surfaces. However, the optical axes should be perpendicular or approximately perpendicular to the incident plane so as to improve the photoelectric conversion efficiency of the linear image sensors. Further, the angle formed by the optical axis A and the incident plane need not be exactly 90° but should be substantially perpendicular or approximately perpendicular. The "approximately perpendicular" angle is relatively defined by the spread angle δ of the light φ etc., while the same is generally an angle smaller than 45°, as shown in FIG. 7, for example.

D. Modification

In each of the aforementioned embodiments, the linear image sensors 42R, 42G and 42B are integrated with one another to form the multi-row linear image sensor 40. Thus, substantially no misalignment can be caused between the linear image sensors 42R, 42G and 42B. However, when the linear image sensors 42R, 42G and 42B are fixed to the spectroscope 20 as shown in FIG. 4, the mutual positional relation among the respective linear image sensors 42R, 42G and 42B is fixed through the spectroscope 20. Hence the sensors need not necessarily be formed as a multi-row image sensor.

The present invention is not restricted to a process color scanner, but may also be applied to an image reader employed for a color facsimile or a color copying apparatus.

According to present invention, the spectroscope is integrated with linear image sensors and the image-formation positions of respective color light components have a common conjugate position. Thus, an image reader which is not susceptible to quality deterioration of an image caused by misalignment can be obtained.

Furthermore, since the optical axis of the incident light is perpendicular or approximately perpendicular to the light incident plane and since optical axes of the color light components are perpendicular or substantially perpendicular to the light receiving surfaces, restrictions in the spread angle of the incident image-formation light can be relaxed. Thus, light receiving efficiency is improved. The quality of a read image can be further improved through a synergistic effect with the aforementioned prevention of adverse effects caused by misalignment.

Although the present invention has been described and illustrated in detail, it is clearly understood that the same is by way of illustration and example only and is not to be taken by way of limitation. The spirit and scope of the present invention should be limited only by the terms of the appended claims.

What is claimed is:

1. An image reader for separating light from scanning lines of an original image into color light components and for receiving said color light components by respective linear image sensors to read each of said scanning lines of said original image, comprising:
   (a) an optical system for converting light from an original image into image-formation light;
   (b) a spectroscope for forming and directing color light components of said image-formation light; and
   (c) an image sensing device fixed to said spectroscope, said image sensing device including linear image sensors for receiving said color light components, said linear image sensors including surfaces for receiving said color light components; and wherein said spectrocsope includes:
   (1) a plurality of transparent bodies;
   (2) a light incident plane for allowing said image-formation light to enter the interior of said spectroscope, said plane being adapted to be substantially perpendicular to the optical axis of said image-formation light;
   (3) color separation planes for selectively reflecting said image-formation light in said interior of said spectroscope to separate said image-formation light into said color light components;
   (4) optical axis direction changing planes for reflecting said color light components and directing said color light components to form images on said surfaces of said linear image sensors, said optical axis direction changing planes being adapted to direct said color light components such that said images formed on said surfaces of said linear image sensors have a common conjugate position with respect to said spectroscope, said optical axis direction changing planes being adapted to direct each of said color light components onto said surfaces of said linear image sensors in a direction which is perpendicular to said surfaces of said linear image sensors;
   (5) means for totally reflecting said color light components at said optical axis direction changing planes; and
   (6) means for reflecting said color light components either an exclusively even number of times or an exclusively odd number of times.

2. An image reader for separating light from scanning lines of an original image into color light components and for receiving said color light components by respective linear image sensors to read each of said scanning lines of said original image, comprising:
   (a) an optical system for converting light from an original image into image-formation light;

(b) a spectroscope for forming and directing color light components of said image-formation light; and (c) an image sensing device fixed to said spectroscope and comprising a multi-row image sensor having a common substrate, said image sensing device including linear image sensors for receiving said color light components, said linear image sensors including surfaces for receiving said color light components; said linear image sensors consisting of three sensors arrayed at equal intervals and being formed parallel to each other on one surface of said common substrate; and wherein said spectroscope includes;

(1) a plurality of transparent bodies;

(2) a light incident plane for allowing said image-formation light to enter the interior of said spectroscope;

(3) color separation planes for selectively reflecting said image-formation light in said interior of said spectroscope to separate said image-formation light into said color light components; and (4) optical axis direction changing planes for reflecting said color light components and directing said color light components to form images on surfaces of said linear image sensors, said optical axis direction changing planes being adapted to direct said color light components such that said images formed on said surfaces of said linear image sensors have a common conjugate position with respect to said spectroscope, said optical axis direction changing planes being adapted to direct each of said color light components onto said surfaces of said linear image sensors in a direction which is perpendicular to said surfaces of said linear image sensors.

3. The invention of claim 2, wherein said image sensing device includes color filters fixed on said surfaces of said linear image sensors.

4. An image reader, comprising:
(A) a spectroscope;
(B) means for directing light to be imaged into said spectroscope; and
(C) first, second, and third image sensors located adjacent said spectroscope;
said spectroscope including a plurality of transparent bodies located immediately adjacent one another and having color selective reflective surfaces formed thereon, the shape of said transparent bodies and the location of said color selective reflective surfaces being such that light directed into said spectroscope is broken up into first, second, and third color components and said first, second, and third color components are directed to said first, second, and third image sensors, respectively;
said spectroscope further including means for reflecting said color components either an exclusively even number of times or an exclusively odd number of times.

5. An image reader, comprising:
(A) a spectroscope;
(B) means for directing light to be imaged into said spectroscope; and
(C) first, second, and third image sensors located adjacent said spectroscope and consisting of three linear image sensors arrayed at equal intervals;
said spectroscope including a plurality of transparent bodies located immediately adjacent one another and having color selective reflective surfaces formed thereon, the shape of said transparent bodies and the location of said color selective reflective surfaces being such that light directed into said spectroscope is broken up into first, second, and third components and said first, second, and third components are directed to said first, second, and third image sensors, respectively.

* * * * *